US012498655B2

(12) United States Patent
Kubo et al.

(10) Patent No.: US 12,498,655 B2
(45) Date of Patent: Dec. 16, 2025

(54) FILM, MEMBER, TRANSFER DEVICE, AND IMAGE FORMING APPARATUS

(71) Applicant: FUJIFILM Business Innovation Corp., Tokyo (JP)

(72) Inventors: Yosuke Kubo, Kanagawa (JP); Masato Furukawa, Kanagawa (JP); Ryosuke Kubota, Kanagawa (JP); Daisuke Tanemura, Kanagawa (JP); Masayuki Seko, Kanagawa (JP); Yoshiro Yamashita, Kanagawa (JP); Shigeru Fukuda, Kanagawa (JP); Hiroaki Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/808,364

(22) Filed: Aug. 19, 2024

(65) Prior Publication Data

US 2025/0284227 A1 Sep. 11, 2025

(51) Int. Cl.
*G03G 15/16* (2006.01)
*C08L 79/08* (2006.01)

(52) U.S. Cl.
CPC ............ *G03G 15/162* (2013.01); *C08L 79/08* (2013.01); *C08L 2203/16* (2013.01); *G03G 2215/1623* (2013.01)

(58) Field of Classification Search
CPC .......... G03G 15/162; G03G 2215/1623; C08L 79/08; C08L 2203/16
See application file for complete search history.

(56) References Cited

U.S. PATENT DOCUMENTS

| | | | | |
|---|---|---|---|---|
| 2006/0275570 A1* | 12/2006 | Egawa | G03G 15/162 428/323 |
| 2012/0301191 A1* | 11/2012 | Ito | G03G 15/162 399/302 |
| 2012/0305857 A1 | 12/2012 | Wu | |
| 2018/0334583 A1* | 11/2018 | Tamiya | G03B 9/14 |
| 2023/0259056 A1 | 8/2023 | Kubo et al. | |
| 2024/0118646 A1 | 4/2024 | Tanaka et al. | |

FOREIGN PATENT DOCUMENTS

| | | |
|---|---|---|
| JP | 2007-072197 A | 3/2007 |
| JP | 2008-197365 A | 8/2008 |
| JP | 4407426 B2 | 2/2010 |
| JP | 2012-068558 A | 4/2012 |

OTHER PUBLICATIONS

Jan. 27, 2025 Search Report issued in European Patent Application No. 24196355.2.

* cited by examiner

*Primary Examiner* — Joseph S Wong
(74) *Attorney, Agent, or Firm* — Oliff PLC

(57) ABSTRACT

A film includes: a binder resin; and an ester-modified silicone resin, in which the film has a first surface having a static friction coefficient denoted as A and a second surface having a static friction coefficient denoted as B, and A/B is 0.85 or less.

20 Claims, 1 Drawing Sheet

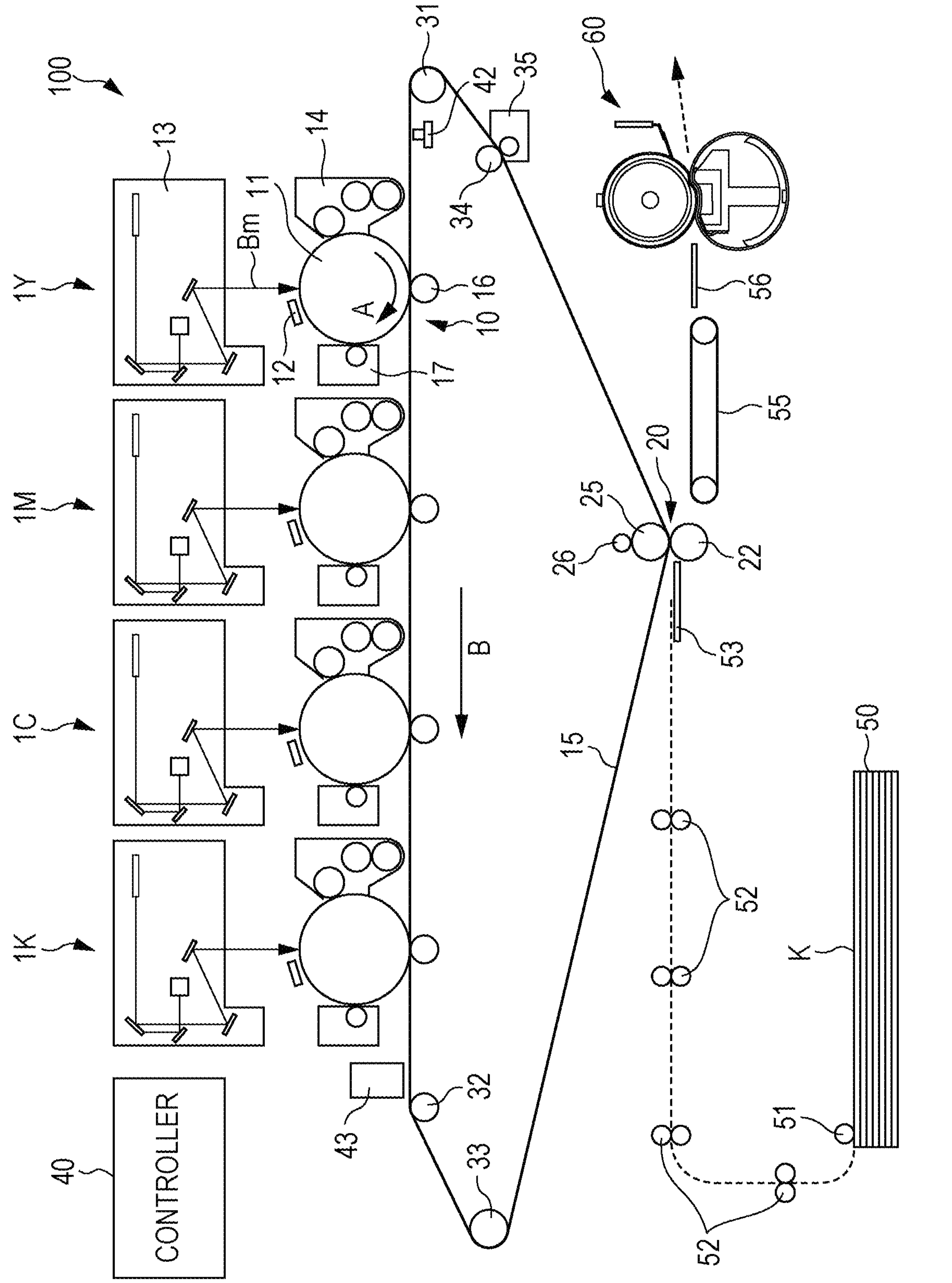
100
1Y
1M
1C
1K
13
14
11
Bm
A
12
17
10
16
B
31
42
35
34
60
56
55
20
25
26
22
53
15
50
52
K
51
43
32
33
40
CONTROLLER

FILM, MEMBER, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2024-037611 filed Mar. 11, 2024.

BACKGROUND

(i) Technical Field

The present disclosure relates to a film, a member, a transfer device, and an image forming apparatus.

(ii) Related Art

In electrophotographic image forming apparatuses (such as copiers, facsimiles, and printers), a toner image formed on a surface of an image holding member is transferred and fixed to form an image.

One previously disclosed member used for a transfer device of an image forming apparatus is a semiconductive polyimide film containing silicon-modified polyimide, having a high elastic modulus, and having an outer surface with a reduced friction coefficient and an inner surface with a higher friction coefficient than the outer surface irrespective of the layer structure (see, for example, Japanese Unexamined Patent Application Publication No. 2008-197365).

SUMMARY

Aspects of non-limiting embodiments of the present disclosure relate to a film that includes a binder resin and an ester-modified silicone resin and has a first surface having a static friction coefficient denoted as A and a second surface having a static friction coefficient denoted as B, wherein releasability from the first surface and the sliding resistance of the second surface are better than those when A/B is more than 0.85.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a film including:

a binder resin; and an ester-modified silicone resin, wherein the film has a first surface having a static friction coefficient denoted as A and a second surface having a static friction coefficient denoted as B, and A/B is 0.85 or less.

BRIEF DESCRIPTION OF THE DRAWING

An exemplary embodiment of the present disclosure will be described in detail based on the following FIGURE, wherein:

FIG. 1 is a schematic illustration showing an example of an image forming apparatus in an exemplary embodiment.

DETAILED DESCRIPTION

An exemplary embodiment of the present disclosure will be described below. The description and Examples are illustrative of the exemplary embodiment and are not intended to limit the scope of the present disclosure.

In the present specification, a numerical range represented using "to" means a range including the numerical values before and after the "to" as the minimum value and the maximum value, respectively.

In a set of numerical ranges expressed in a stepwise manner in the exemplary embodiment, the upper or lower limit in one numerical range may be replaced with the upper or lower limit in another numerical range in the set. Moreover, in a numerical range described in the exemplary embodiment, the upper or lower limit in the numerical range may be replaced with a value indicated in an Example.

In the present specification, the term "step" is meant to include not only an independent step but also a step that is not clearly distinguished from other steps, so long as the prescribed purpose of the step can be achieved.

In the present specification, when the exemplary embodiment is explained with reference to the drawing, the structure of the exemplary embodiment is not limited to the structure shown in the drawing. In the drawing, the sizes of the components are conceptual, and the relative relations between the components are not limited to those shown in the drawing.

In the present specification, any component may contain a plurality of materials corresponding to the component. When reference is made to the amount of a component in a composition in the exemplary embodiment, if the composition contains a plurality of materials corresponding to the component, the amount means the total amount of the plurality of materials in the composition, unless otherwise specified.

In the present specification, the "first surface of the film" means, for example, the outer circumferential surface of a belt (an intermediate transfer belt formed from an endless film) that is an intermediate transfer body of a transfer device of an image forming apparatus to which the film in the present exemplary embodiment is applied.

In the present specification, the "second surface of the film" means, for example, the inner circumferential surface of the belt (the intermediate transfer belt formed from the endless film) that is the intermediate transfer body of the transfer device of the image forming apparatus to which the film in the present exemplary embodiment is applied.

In the present specification, the term "ester-modified silicone resin" is intended to include polyester-modified silicone resins.

<Film>

The film in the present exemplary embodiment contains a binder resin and an ester-modified silicone resin. The film has a first surface having a static friction coefficient denoted as A and a second surface having a static friction coefficient denoted as B, and A/B is 0.85 or less.

The film configured as described above contains the binder resin and the ester-modified silicone resin and has the first surface having a static friction coefficient denoted as A and the second surface having a static friction coefficient denoted as B, and the releasability from the first surface and the sliding resistance of the second surface are better than those when A/B is more than 0.85. The reason for this may be as follows.

One previously known method for imparting releasability to a film is to add a release agent to the film. However, when the release agent is added to the film, the releasability is imparted to both the first and second surfaces of the film, and their sliding resistance deteriorates.

However, in the film in the present exemplary embodiment, methyl groups in the ester-modified silicone resin contained in a film-forming coating solution tend to be oriented at the gas-liquid interface when the film is formed. Therefore, the static friction coefficient A of the first surface of the film decreases, and the releasability is improved.

Moreover, in the film in the present exemplary embodiment, silanol groups in the ester-modified silicone resin contained in the film-forming coating solution tend to be oriented at the interface between the coating solution and the surface coated therewith rather than at the gas-liquid interface due to the chemical interaction between the coating solution and the coated surface when the film is formed. Therefore, the static friction coefficient B of the second surface of the film increases, and the sliding resistance is improved (in particular, when the coated surface has been treated with a silicone resin-based release agent, the above tendency is likely to increase).

It is therefore inferred that because of the reason described above, the releasability from the first surface of the film in the present exemplary embodiment and the sliding resistance of the second surface are good.

The film in the present exemplary embodiment has the effects described above. Therefore, when the film is applied to an intermediate transfer body (an intermediate transfer belt formed from an endless film) of a transfer device of an image forming apparatus, toner releasability from the outer circumferential surface of the belt is improved. Moreover, slippage is unlikely to occur between the inner circumferential surface of the belt and a belt driving roller.

The details of the film in the present exemplary embodiment will be described.

—Binder Resin—

Examples of the binder resin include polyimide resins (PI resins), polyamide-imide resins (PAI resins), polyether ketone resins (such as aromatic polyether ether ketone resins), polyphenylene sulfide resins (PPS resins), polyetherimide resins (PEI resins), polyester resins, polystyrene resins, polyamide resins, polycarbonate resins, polyethylene terephthalate resins (PET resins), and resin mixtures thereof.

Other examples of the binder resin include chloroprene rubber, epichlorohydrin rubber, isoprene rubber, butyl rubber, polyurethane, fluorocarbon rubber, styrene-butadiene rubber, butadiene rubber, nitrile rubber (NBR), ethylene propylene rubber, ethylene-propylene-diene ternary copolymer rubber, natural rubber, and rubber mixtures thereof.

In particular, from the viewpoint of improving the mechanical properties of the film, polyimide-based resins such as polyimide (PI) resins and polyamide-imide (PAI) resins may be used.

Examples of the polyimide resin include imidized products of polyamic acids (precursors of polyimide resins) that are polymers of tetracarboxylic dianhydrides and diamine compounds.

The polyimide resin is, for example, a resin having a structural unit represented by the following general formula (I).

General Formula (I)

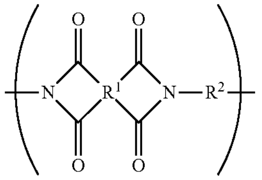

In general formula (I), $R^1$ represents a tetravalent organic group, and $R^2$ represents a divalent organic group.

Examples of the tetravalent organic group represented by $R^1$ include aromatic groups, aliphatic groups, alicyclic groups, combinations of aromatic and aliphatic groups, and substituted groups thereof. Specific examples of the tetravalent organic group include residues of tetracarboxylic dianhydrides described later.

Examples of the divalent organic group represented by $R^2$ include aromatic groups, aliphatic groups, alicyclic groups, combinations of aromatic and aliphatic groups, and substituted groups thereof. Specific examples of the divalent organic group include residues of diamine compounds described later.

Specific examples of the tetracarboxylic dianhydride used as a raw material of the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

Examples of the polyamide-imide resin include resins having a repeating unit including an imide bond and an amide bond.

More specific examples of the polyamide-imide resin include a polymer of a tricarboxylic acid compound (referred to also as a tricarboxylic acid) having an acid anhydride group with a diisocyanate compound or a diamine compound.

The tricarboxylic acid may be trimellitic anhydride or a derivative thereof. The tricarboxylic acid may be used in combination with a tetracarboxylic dianhydride, an aliphatic dicarboxylic acid, an aromatic dicarboxylic acid, etc.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'- diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include compounds that have structures similar to the structures of the above isocyanates and have amino groups instead of the isocyanato groups.

The content of the binder resin with respect to 100% by mass of the film is preferably 70% by mass or more and 99.95% by mass or less, more preferably 75% by mass or more and 98% by mass or less, and still more preferably 80% by mass or more and 90% by mass or less.

—Ester-Modified Silicone Resin—

The ester-modified silicone resin is, for example, a polyester-modified silicone resin obtained by modifying at least one of the side chains and terminal ends of a polysiloxane chain with polyester. The polyester-modified silicone resin is obtained by the reaction of alkoxysilane, alkoxysiloxane, or a mixture thereof with, for example, a polyester resin having 2 or more hydroxy groups.

The ester-modified silicone resin may have a silanol group at at least one of the terminal ends of the main and side chains. When the ester-modified silicone resin has a silanol group at at least one of the terminal ends of the main and side chains, silanol groups in the ester-modified silicone resin contained in the film-forming coating solution tend to be oriented at the interface between the film-forming coating solution and the surface coated therewith due to the chemical interaction between the film-forming coating solution and the coated surface, and therefore the sliding resistance of the second surface of the film is likely to be improved.

The content of the ester-modified silicone resin with respect to 100% by mass of the binder resin is preferably 0.1% by mass or more and 6.0% by mass or less, more preferably 1.0% by mass or more and 5.5% by mass or less, and still more preferably 3.0% by mass or more and 5.0% by mass or less. Since the content of the ester-modified silicone resin with respect to 100% by mass of the binder resin is 0.1% by mass or more and 6.0% by mass or less, methyl groups in the ester-modified silicone resin contained in the film-forming coating solution tend to be oriented at the gas-liquid interface, and the releasability from the first surface of the film is likely to be improved. Moreover, silanol groups in the ester-modified silicone resin contained in the film-forming coating solution tend to be oriented at the interface between the film-forming coating solution and the surface coated therewith, and therefore the sliding resistance of the second surface of the film is likely to be improved.

The film in the present exemplary embodiment may contain an additive. The additive is selected according to the application of the film, and examples thereof include well-known additives such as a conducting agent, a reinforcing agent, an antioxidant, a surfactant, and a heat-resistant antioxidant.

The conducing agent, which is a typical additive, will be described.

Examples of the conducing agent include carbon black, metals (such as aluminum and nickel), metal oxides (such as yttrium oxide and tin oxide), carbon nanotubes, ionic conductive materials (such as potassium titanate and LiCl). Of these, carbon black may be used.

One of these conducing agents may be used alone, or a combination or two or more may be used.

Examples of the carbon black include Ketjen black, oil furnace black, channel black (i.e., gas black), and acetylene black. The carbon black used may be carbon black subjected to surface treatment (which hereinafter may be referred to as "surface-treated carbon black").

The surface-treated carbon black is obtained by adding a carboxy group, a quinone group, a lactone group, a hydroxy group, etc. to the surface of carbon black. Examples of the surface treatment method include an air oxidation method in which carbon black is brought into contact with air in a high-temperature atmosphere to react therewith, a method in which carbon black is allowed to react with nitrogen oxide or ozone at room temperature (e.g., 22° C.), and a method in which carbon black is oxidized with air in a high-temperature atmosphere and then oxidized with ozone at low temperature.

In particular, the conducing agent is preferably channel black and particularly preferably acidic carbon black having a pH of 5.0 or less.

The acidic carbon black may be carbon black subjected to surface oxidation treatment, and examples thereof include carbon black with a carboxyl group, a quinone group, a lactone group, a hydroxy group, etc. added to the surface thereof.

From the viewpoint of improving transferability onto non-smooth paper sheets, the pH of the acidic carbon black is preferably 4.5 or less, more preferably 4.0 or less, still more preferably 3.0 or less, particularly preferably 2.0 or more and 3.0 or less, and most preferably 2.0 or more and 2.8 or less.

The pH of the acidic carbon black is a value measured by a pH measurement method defined in JIS Z8802 (2011).

When the film contains an additive, no particular limitation is imposed on the content of the additive (such as the conducting agent) so long as the effects of the present exemplary embodiment are not impaired. The content of the additive with respect to 100% by mass of the binder resin may be, for example, 0% by mass or more and 10% by mass or less.

In the film in the present exemplary embodiment, the first surface of the film has a static friction coefficient of A, and the second surface of the film has a static friction coefficient of B. The static friction coefficient A of the first surface of the film may be 0.3 to 0.4, and A/B is 0.85 or less, preferably 0.80 or less, more preferably 0.75 or less, and still more preferably 0.70 or less.

The static friction coefficient A of the first surface of the film and the static friction coefficient B of the second surface can be measured as follows. A portable tribometer (Muse TYPE: 94i-II manufactured by Shinto Scientific Co., Ltd.) is used. One of the first and second surfaces is attached to a slider (contact) of the tribometer, and the measurement is performed under the conditions of a temperature of 22° C. and a humidity of 55%.

When polyester resin particles having a volume average particle diameter of 4.7 μm are caused to adhere to the first surface of the film in the present exemplary embodiment under a load of 0 N and then air is blown onto the first surface from above while the blowing pressure is increased, all the polyester resin particles adhering to the first surface are separated from the first surface before or when the blowing pressure reaches 16 kPa.

The film in the present exemplary embodiment may be applied to an intermediate transfer body (intermediate transfer belt) of a transfer device of an image forming apparatus. In this case, when the above-described releasability condition is met, the non-electrostatic adhesive force generated between the outer circumferential surface of the belt and the toner is small. Therefore, even when a non-smooth paper sheet is used as a recording medium, the occurrence of blank spots in the image due to a reduction in transferability can be reduced.

Whether or not the releasability condition is met is determined as follows.

First, a 3 cm×4 cm rectangular test specimen is cut from a film used for the measurement.

Next, the polyester resin particles are sprayed onto the surface of the film corresponding to its first surface from a height of 15 cm in an environment of a temperature of 22° C. and a relative humidity of 15% RH while the test specimen is held horizontally with a voltage of 10 kV applied. The polyester resin particles are caused to adhere such that the mass per unit area is 3 $g/cm^2$ (under a load of 0 N).

The polyester resin particles are a polycondensation product of dimethyl fumarate, which is a dicarboxylic acid, and propylene glycol, which is a diol, and are resin particles having a weight average molecular weight of 25000 and a volume average particle diameter of 4.7 μm.

Next, air is blown onto a central portion of the polyester resin particle-adhering surface of the test specimen from an air blowing port disposed at a height of 3 cm and having a diameter of 0.7 mm at an initial blowing pressure of 0.1 kPa, and then the blowing pressure is increased at 0.5 kPa/second.

If all the polyester resin particles have been separated from the test specimen by the time the blowing pressure reaches 16 kPa, the releasability is considered satisfactory.

If some polyester resin particles remain present on the test specimen even after the blowing pressure exceeds 16 kPa, the releasability is considered unsatisfactory.

The weight average molecular weight of the polyester resin particles is measured by gel permeation chromatography (GPC). In the molecular weight measurement by GPC, a GPC measurement apparatus GPC-HLC-8120GPC manufactured by TOSOH Corporation is used. A TSKgel Super HM-M (15 cm) column manufactured by TOSOH Corporation is used, and a THF solvent is used. The weight average molecular weight and the number average molecular weight are computed from the measurement results using a molecular weight calibration curve produced using monodispersed polystyrene standard samples.

The volume average particle diameter of the polyester resin particles is measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (which may be sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using an aperture having an aperture diameter of 100 μm in the Coulter Multisizer II. The number of particles sampled is 50000.

The particle size distribution measured and divided into particle size ranges (channels) is used to obtain a volume-based cumulative distribution computed from the small diameter side. The particle diameter at a cumulative frequency of 50% is defined as a volume average particle diameter D50v.

The film in the present exemplary embodiment can be produced, for example, by applying a coating solution for forming the film (a film-forming coating solution) to a substrate and then drying the substrate.

<Member>

A member in the present exemplary embodiment includes the film in the present exemplary embodiment. The member in the present exemplary embodiment may have the film as a layer forming the outer circumferential surface. The member in the present exemplary embodiment may be a single layer member composed of the film in the present exemplary embodiment or may be a member including a substrate and the film in the present exemplary embodiment disposed thereon.

When the member in the present exemplary embodiment is used for an intermediate transfer body of an electrophotographic image forming apparatus, the member used may be a single layer body composed of the film in the present exemplary embodiment or a layered body including the film as the outermost layer. In the layered body, layers other than the film (such as a base layer on which the film is disposed and an elastic layer disposed between the film and the base layer) may be well-known layers for the intermediate transfer body.

<Transfer Device>

Next, a transfer device in the present exemplary embodiment will be described.

The transfer device in the present exemplary embodiment includes:

- an intermediate transfer body including the member in the present exemplary embodiment and having an outer circumferential surface onto which a toner image is to be transferred;
- a first transfer unit that first-transfers a toner image formed on the surface of an image holding member onto the surface of the intermediate transfer body; and
- a second transfer unit that second-transfers the toner image transferred onto the surface of the intermediate transfer body onto a surface of a recording medium.

(First Transfer Unit)

In the first transfer unit, a first transfer member is disposed so as to be opposed to the image holding member with the intermediate transfer body therebetween. In the first transfer unit, the first transfer member is used to apply a voltage whose polarity is opposite to the charge polarity of the toner to the intermediate transfer body, and the toner image is thereby first-transferred onto the outer circumferential surface of the intermediate transfer body.

(Second Transfer Unit)

In the second transfer unit, a second transfer member is disposed on the toner image holding side of the intermediate transfer body. The second transfer unit further includes, in addition to the second transfer member, a back member disposed on the side opposite to the toner image holding side of the intermediate transfer body. In the second transfer unit, the intermediate transfer body and a recording medium are sandwiched between the second transfer member and the back member, and a transfer electric field is formed to second-transfer the toner image on the intermediate transfer body onto the recording medium.

The second transfer member may be a second transfer roller or may be a second transfer belt. The back member used is, for example, a back roller.

The transfer device in the present exemplary embodiment may be a transfer device that transfers a toner image onto the surface of a recording medium through a plurality of intermediate transfer bodies. Specifically, the transfer device may be, for example, as follows. A toner image is first-transferred from the image holding member onto a first intermediate transfer body, and the toner image is second-transferred from the first intermediate transfer body onto a second intermediate transfer body. Then the toner image is third-transferred from the second intermediate transfer body onto a recording medium.

In the transfer device, an intermediate transfer body including the film in the present exemplary embodiment described above is applied to at least one of the plurality of intermediate transfer bodies.

<Image Forming Apparatus>

Next, an image forming apparatus in the present exemplary embodiment will be described.

The image forming apparatus in the present exemplary embodiment includes: image holding members; charging devices that charge the surfaces of the respective image holding members; electrostatic latent image forming devices that form electrostatic latent images on the charged surfaces of the respective image holding members; developing devices that house respective developers containing toners and develop the electrostatic latent images formed on the surfaces of the image holding members with the respective developers to thereby form toner images; a transfer device that transfers the toner images onto a surface of a recording medium; and a fixing device that fixes the toner images to the recording medium.

The transfer device in the present exemplary embodiment is used for the above transfer device.

In the image forming apparatus in the present exemplary embodiment, the transfer device and the fixing device may each be formed as a cartridge detachably attached to the image forming apparatus. Specifically, the image forming apparatus in the present exemplary embodiment may include the transfer device in the present exemplary embodiment as a component of a process cartridge.

The image forming apparatus in the present exemplary embodiment will be described with reference to FIG. 1.

FIG. 1 is a schematic illustration showing the structure of the image forming apparatus in the present exemplary embodiment.

As shown in FIG. 1, the image forming apparatus 100 in the present exemplary embodiment is, for example, an intermediate transfer type image forming apparatus having a so-called tandem configuration and includes: a plurality of image forming units 1Y, 1M, 1C, and 1K that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and a fixing device 60 that fixes the second-transferred images to the paper sheet K. The image forming apparatus 100 further includes a controller 40 that controls the operation of each device (each unit).

Each of the image forming units 1Y, 1M, 1C, and 1K of the image forming apparatus 100 includes a photoreceptor 11 that rotates in the direction of an arrow A and serves as an example of the image holding members each of which holds a toner image formed on its surface.

A charging unit 12 that charges the photoreceptor 11 and serves as an example of the charging device is disposed near the circumferential surface of the photoreceptor 11. A laser exposure unit 13 serving as an example of the electrostatic latent image forming device and used to write an electrostatic latent image on the photoreceptor 11 is disposed above the photoreceptor 11 (in FIG. 1, an exposure beam is denoted by symbol Bm).

A developing unit 14 that serves as an example of the developing device, houses a color toner, and visualizes the electrostatic latent image on the photoreceptor 11 with the toner is disposed near the circumferential surface of the photoreceptor 11, and a first transfer roller 16 that transfers the color toner image formed on the photoreceptor 11 onto the intermediate transfer belt 15 in a corresponding first transfer unit 10 is disposed near the circumferential surface of the photoreceptor 11.

A photoreceptor cleaner 17 that removes the toner remaining on the photoreceptor 11 is disposed near the circumferential surface of the photoreceptor 11. These electrophotographic devices including the charging unit 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 serving as the intermediate transfer body is formed from a film-shaped pressing belt that includes a base layer made of a resin and contains an appropriate amount of an antistatic agent such as carbon black. The intermediate transfer belt 15 is formed so as to have a volume resistivity of $10^6$ Ω·cm or more and $10^{14}$ Ω·cm or less, and its thickness is, for example, about 0.1 mm.

The intermediate transfer belt 15 is circulated (rotated) by various rollers in a direction B shown in FIG. 1 at a speed appropriate for its intended use. These rollers include: a driving roller 31 driven by a motor (not shown) having a good constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which the toners remaining on the intermediate transfer belt 15 are scraped off.

Each first transfer unit 10 includes a corresponding first transfer roller 16 facing a corresponding photoreceptor 11 with the intermediate transfer belt 15 therebetween. The first transfer roller 16 includes a core and a sponge layer serving as an elastic layer adhering to the circumferential surface of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of $10^{7.5}$ Ω·cm or more and $10^{8.5}$ Ω·cm or less.

The first transfer roller 16 is disposed so as to be pressed against the photoreceptor 11 with the intermediate transfer belt 15 therebetween, and a voltage (first transfer bias) with polarity opposite to the charge polarity of the toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The surface of the back roller 25 is formed from a tube made of a rubber blend of EPDM and NBR with carbon dispersed therein, and the inner portion of the back roller 25 is made of EPDM rubber. The back roller 25 is formed such that its surface resistivity is $10^7$ Ω/square or more and $10^{10}$ Ω/square or less, and its hardness is set to, for example, 70° (the ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 includes a core and a sponge layer serving as an elastic layer adhering to the circumferential surface of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of $10^{7.5}$ Ω·cm or more and $10^{8.5}$ Ω·cm or less.

The second transfer roller 22 is disposed so as to be pressed against the back roller 25 with the intermediate transfer belt 15 therebetween. The second transfer roller 22 is grounded. The second transfer bias is formed between the second transfer roller 22 and the back roller 25, and the toner images are second-transferred onto a paper sheet K transported to the second transfer unit 20.

An intermediate transfer belt cleaner 35 is disposed downstream of the second transfer unit 20 so as to be separable from the intermediate transfer belt 15. The intermediate transfer belt cleaner 35 removes the toners and paper powder remaining on the intermediate transfer belt 15 after the second transfer to thereby clean the surface of the intermediate transfer belt 15.

The intermediate transfer belt 15, the first transfer units 10 (the first transfer rollers 16), and the second transfer unit 20 (the second transfer roller 22) correspond to an example of the transfer device.

A reference sensor (home position sensor) 42 that generates a reference signal used as a reference for image formation timings in the image forming units 1Y, 1M, 1C, and 1K is disposed upstream of the yellow image forming unit 1Y. When the reference sensor 42 detects a mark provided on the back side of the intermediate transfer belt 15, the reference sensor 42 generates the reference signal. The controller 40 issues instructions based on the reference signal to start image formation in the image forming units 1Y, 1M, 1C, and 1K.

An image density sensor 43 for image quality adjustment is disposed downstream of the black image forming unit 1K.

The image forming apparatus in the present exemplary embodiment further includes, as a transport unit that transports a paper sheet K: a paper sheet container 50 that contains paper sheets K; a paper feed roller 51 that picks up and transports the paper sheets K stacked in the paper sheet container 50 one by one at predetermined timing; transport rollers 52 that transport each paper sheet K fed by the paper feed roller 51; a transport guide 53 that feeds the paper sheet K transported by the transport rollers 52 to the second transfer unit 20; a transport belt 55 that transports, to the fixing device 60, the paper sheet K transported after second transfer by the second transfer roller 22; and a fixation entrance guide 56 that guides the paper sheet K to the fixing device 60.

Next, a basic image forming process of the image forming apparatus in the present exemplary embodiment will be described.

In the image forming apparatus in the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

Each of the laser exposure units 13 irradiates the photoreceptor 11 of a corresponding one of the image forming units 1Y, 1M, 1C, and 1K with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The formed electrostatic latent images are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) with polarity opposite to the charge polarity (negative polarity) of the toner is applied by the first transfer roller 16 to the base of the intermediate transfer belt 15. The toner images are thereby sequentially superposed onto the surface of the intermediate transfer belt 15, and the first transfer is completed.

After the toner images have been sequentially first-transferred onto the surface of the intermediate transfer belt 15, the intermediate transfer belt 15 moves, and the toner images are transported toward the second transfer unit 20. When the toner images are transported toward the second transfer unit 20, the paper feed roller 51 in the transport unit starts rotating at the timing of transportation of the toner images toward the second transfer unit 20 to feed a paper sheet K of the intended size from the paper sheet container 50. The paper sheet K fed by the paper feed roller 51 is transported by the transport rollers 52 and reaches the second transfer unit 20 through the transport guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 with the intermediate transfer belt 15 therebetween. In this case, the paper sheet K transported at the appropriate timing is pinched between the intermediate transfer belt 15 and the second transfer roller 22. Then, when a voltage (second transfer bias) with the same polarity as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and transported by the second transfer roller 22 to the transport belt 55 disposed downstream, with respect to the transfer direction of the paper sheet, of the second transfer roller 22. The transport belt 55 transports the paper sheet K to the fixing device 60 at an optimal transport speed for the fixing device 60. The unfixed toner images on the paper sheet K transported to the fixing device 60 are subjected to fixing processing using heat and pressure by the fixing device 60 and thereby fixed to the paper sheet K. The paper sheet K with the fixed image formed thereon is transported to an output sheet container (not shown) disposed in an output unit of the image forming apparatus.

After completion of transfer onto the paper sheet K, the toner remaining on the intermediate transfer belt 15 is transported to the cleaning unit by the rotation of the intermediate transfer belt 15 and is removed from the intermediate transfer belt 15 by the cleaning back roller 34 and the intermediate transfer belt cleaner 35.

Although the exemplary embodiment has been described, the present disclosure is not to be construed as being limited to the exemplary embodiment, and various modifications, changes, and improvements are possible.

EXAMPLES

The present exemplary embodiment will be more specifically described by way of Examples. However, the present exemplary embodiment is not limited to the following Examples.

Example 1

An ester-modified silicone resin (KR-5235 manufactured by Shin-Etsu Chemical Co., Ltd.) and carbon black (FW200 manufactured by Orion Engineered Carbons) are added to a polyimide varnish (JIV-300R manufactured by JFE Chemical Corporation, solid content: 18% by mass) in such amounts that the ratio of the ester-modified silicone resin with respect to the mass of the imidized polyimide resin is 5.0% by mass and the ratio of the carbon black with respect to the mass of the imidized polyimide resin is 20% by mass, and the mixture is stirred using a centrifugal mixer (manufactured by KEYENCE CORPORATION) for 60 minutes to thereby obtain a film-forming coating solution.

Next, the film-forming coating solution is applied to a cylindrical substrate by a spiral coating method to a film thickness of 100 μm, and then the resulting substrate is heated and dried at 160° C. for 30 minutes and at 300° C. for 1 hour to thereby obtain an endless film.

Then a release agent (SEPA-COAT manufactured by Shin-Etsu Chemical Co., Ltd.) is applied to the outer circumferential surface of the cylindrical substrate.

Example 2

An endless film is obtained using the same procedure as in Example 1 except that the amount of the ester-modified silicone resin added with respect to the amount of the imidized polyimide resin is changed to 0.30% by mass.

Example 3

An endless film is obtained using the same procedure as in Example 1 except that the polyimide varnish is changed to a polyamide-imide varnish (HPC-9000F-8H manufactured by Resonac Corporation) and that the amount of the ester-modified silicone resin added with respect to the amount of the imidized polyamide-imide resin is changed to 3.0% by mass.

Comparative Example 1

An endless film is obtained using the same procedure as in Example 1 except that the ester-modified silicone resin is changed to 3.0% by mass of dimethylpolysiloxane (PDMS) (KF-96A-5 manufactured by Shin-Etsu Chemical Co., Ltd.).

Comparative Example 2

An endless film is obtained using the same procedure as in Example 1 except that the ester-modified silicone resin is changed to 5.0% by mass of dimethylpolysiloxane (PDMS) (KF-96A-5 manufactured by Shin-Etsu Chemical Co., Ltd.).

Comparative Example 3

An endless film is obtained using the same procedure as in Example 1 except that the amount of the ester-modified silicone resin added with respect to the amount of the imidized polyimide resin is changed to 0.05% by mass.

Comparative Example 4

An endless film is obtained using the same procedure as in Example 1 except that the amount of the ester-modified silicone resin added with respect to the amount of the imidized polyimide resin is changed to 7.0% by mass.

Comparative Example 5

An endless film is obtained using the same procedure as in Example 1 except that a release agent (GW-4500 manufactured by DAIKIN INDUSTRIES, LTD.) is applied to the outer circumferential surface of the cylindrical substrate.

The ester-modified silicone resin (KR-5235 manufactured by Shin-Etsu Chemical Co., Ltd.) is an ester-modified silicone resin having a silanol group at at least one of the terminal ends of the main and side chains.

<Measurement and Evaluation>

—Static Friction Coefficient—

For each of the endless films obtained in the Examples and Comparative Examples, the static friction coefficient of the first surface (i.e., the outer circumferential surface) and the static friction coefficient of the second surface (i.e., the inner circumferential surface) are measured by the method described above. The ratio of the static friction coefficient of the first surface to the static friction coefficient of the second surface is computed. The results are shown in Table 1.

—Releasability—

For each of the endless films obtained in the Examples and Comparative Examples, the blowing pressure of air when all the polyester resin particles (volume average particle diameter: 4.7 μm) adhering to the first surface of the film are separated from the first surface is measured by the method described above. The results are shown in Table 1.

—Transferability—

One of the endless films obtained in the Examples and Comparative Examples is installed as an intermediate transfer belt in an image forming apparatus obtained by modifying “DocuColor-7171P” manufactured by FUJIFILM Business Innovation Corp. A solid blue image is formed on a non-smooth paper sheet (LEATHAC 66, 204 gsm) under the conditions of a temperature of 22° C. and a relative humidity of 55% RH with the transportation speed of the recording medium in the second-transfer region set to 366 mm/s. Blank spots in concave portions are visually checked to evaluate the transferability onto the non-smooth paper sheet. The evaluation is performed according to the following criteria. The results are shown in Table 1. The toner used has a volume average particle diameter of 4.7 μm.

A: No blank spots occur.

B: A slight color change occurs.

C: A distinct color change occurs.

D: Blank spots occur.

A comprehensive chart is outputted under the same conditions, and color misregistration is visually checked and evaluated. The evaluation is performed according to the following criteria. The results are shown in Table 1.

A: No color misregistration is found.

B: Some misregistration is found, but it is within a reference value.

C: Misregistration is found and is above the reference value.

As can be seen, with the films in the Examples, misregistration is small, and the sliding resistance of the second surface is also good.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A film including:

a binder resin; and an ester-modified silicone resin, wherein the film has a first surface having a static friction coefficient denoted as A and a second surface having a static friction coefficient denoted as B, and A/B is 0.85 or less.

(((2))) The film according to (((1))), wherein the binder resin is a polyimide-based resin.

(((3))) The film according to (((1))) or (((2))), wherein, when polyester resin particles having a volume average particle diameter of 4.7 μm are caused to adhere to the first surface under a load of 0 N and then air is blown onto the first surface from above while blowing pressure is increased, all the polyester resin particles adhering to the first surface are separated from the first surface before or when the blowing pressure reaches 16 kPa.

TABLE 1

| | Binder resin | Additive | Amount added (% by mass) | Release agent | Static friction coefficient A (first surface) | Static friction coefficient B (second surface) | A/B | Blowing pressure at separation (kPa) | Transferability onto non-smooth paper | Misregistration |
|---|---|---|---|---|---|---|---|---|---|---|
| Example 1 | Polyimide | KR-5235 (ester-modified silicone resin) | 5.0 | sepa-coat (silicone-based release agent) | 0.37 | 0.62 | 0.60 | 13 | A | A |
| Example 2 | Polyimide | KR-5235 | 0.30 | sepa-coat | 0.39 | 0.70 | 0.56 | 15 | B | A |
| Example 3 | Polyamide-imide | KR-5235 | 3.0 | sepa-coat | 0.4 | 0.47 | 0.85 | 16 | B | B |
| Comparative Example 1 | Polyimide | KF-96A-5 (dimethylpolysiloxane (PDMS)) | 3.0 | sepa-coat | 0.38 | 0.42 | 0.90 | 18 | C | C |
| Comparative Example 2 | Polyimide | KF-96A-5 | 5.0 | sepa-coat | 0.37 | 0.43 | 0.86 | 16 | B | C |
| Comparative Example 3 | Polyimide | KR-5235 | 0.05 | sepa-coat | 0.52 | 0.58 | 0.90 | 20 | D | B |
| Comparative Example 4 | Polyimide | KR-5235 | 7.0 | sepa-coat | 0.36 | 0.41 | 0.88 | 14 | A | C |
| Comparative Example 5 | Polyimide | KR-5235 | 5.0 | GW-4500 (fluorine-based release agent) | 0.37 | 0.42 | 0.88 | 15 | B | C |

As can be seen from Table 1, with the film in the present exemplary embodiment, the blowing pressure is small, and the transferability is also good. Therefore, the releasability from the first surface is good.

(((4))) The film according to any one of (((1))) to (((3))), wherein the content of the ester-modified silicone resin with respect to the mass of the binder resin is 0.1% by mass or more and 6.0% by mass or less.

(((5))) The film according to any one of (((1))) to (((4))), wherein the ester-modified silicone resin has a silanol group at at least one of terminal ends of main and side chains.

(((6))) A member including the film according to any one of (((1))) to (((5))).

(((7))) A transfer device including:

an intermediate transfer body including the member according to (((6))) and having an outer circumferential surface onto which a toner image is to be transferred;

a first transfer unit that first-transfers a toner image formed on a surface of an image holding member onto the outer circumferential surface of the intermediate transfer body; and a second transfer unit that second-transfers the toner image transferred onto the outer circumferential surface of the intermediate transfer body onto a surface of a recording medium.

(((8))) An image forming apparatus including:

an image holding member;

a charging device that charges a surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to thereby form a toner image;

the transfer device according to (((7))) that transfers the toner image onto a surface of a recording medium; and a fixing device that fixes the toner image to the recording medium.

What is claimed is:

1. A film comprising:

a binder resin; and an ester-modified silicone resin, wherein the film has a first surface having a static friction coefficient denoted as A and a second surface having a static friction coefficient denoted as B, and A/B is 0.85 or less.

2. The film according to claim 1, wherein the binder resin is a polyimide-based resin.

3. The film according to claim 1, wherein, when polyester resin particles having a volume average particle diameter of 4.7 μm are caused to adhere to the first surface under a load of 0 N and then air is blown onto the first surface from above while blowing pressure is increased, all the polyester resin particles adhering to the first surface are separated from the first surface before or when the blowing pressure reaches 16 kPa.

4. The film according to claim 1, wherein the content of the ester-modified silicone resin with respect to the mass of the binder resin is 0.1% by mass or more and 6.0% by mass or less.

5. The film according to claim 1, wherein the ester-modified silicone resin has a silanol group at at least one of terminal ends of main and side chains.

6. A member comprising the film according to claim 1.

7. A member comprising the film according to claim 2.

8. A member comprising the film according to claim 3.

9. A member comprising the film according to claim 4.

10. A member comprising the film according to claim 5.

11. A transfer device comprising:

an intermediate transfer body including the member according to claim 6 and having an outer circumferential surface onto which a toner image is to be transferred;

a first transfer unit that first-transfers a toner image formed on a surface of an image holding member onto the outer circumferential surface of the intermediate transfer body; and a second transfer unit that second-transfers the toner image transferred onto the outer circumferential surface of the intermediate transfer body onto a surface of a recording medium.

12. A transfer device comprising:

an intermediate transfer body including the member according to claim 7 and having an outer circumferential surface onto which a toner image is to be transferred;

a first transfer unit that first-transfers a toner image formed on a surface of an image holding member onto the outer circumferential surface of the intermediate transfer body; and a second transfer unit that second-transfers the toner image transferred onto the outer circumferential surface of the intermediate transfer body onto a surface of a recording medium.

13. A transfer device comprising:

an intermediate transfer body including the member according to claim 8 and having an outer circumferential surface onto which a toner image is to be transferred;

a first transfer unit that first-transfers a toner image formed on a surface of an image holding member onto the outer circumferential surface of the intermediate transfer body; and a second transfer unit that second-transfers the toner image transferred onto the outer circumferential surface of the intermediate transfer body onto a surface of a recording medium.

14. A transfer device comprising:

an intermediate transfer body including the member according to claim 9 and having an outer circumferential surface onto which a toner image is to be transferred;

a first transfer unit that first-transfers a toner image formed on a surface of an image holding member onto the outer circumferential surface of the intermediate transfer body; and a second transfer unit that second-transfers the toner image transferred onto the outer circumferential surface of the intermediate transfer body onto a surface of a recording medium.

15. A transfer device comprising:

an intermediate transfer body including the member according to claim 10 and having an outer circumferential surface onto which a toner image is to be transferred;

a first transfer unit that first-transfers a toner image formed on a surface of an image holding member onto the outer circumferential surface of the intermediate transfer body; and a second transfer unit that second-transfers the toner image transferred onto the outer circumferential surface of the intermediate transfer body onto a surface of a recording medium.

16. An image forming apparatus comprising:

an image holding member;

a charging device that charges a surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to thereby form a toner image;

the transfer device according to claim 11 that transfers the toner image onto a surface of a recording medium; and a fixing device that fixes the toner image to the recording medium.

17. An image forming apparatus comprising:

an image holding member;

a charging device that charges a surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to thereby form a toner image;

the transfer device according to claim 12 that transfers the toner image onto a surface of a recording medium; and a fixing device that fixes the toner image to the recording medium.

18. An image forming apparatus comprising:

an image holding member;

a charging device that charges a surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to thereby form a toner image;

the transfer device according to claim 13 that transfers the toner image onto a surface of a recording medium; and a fixing device that fixes the toner image to the recording medium.

19. An image forming apparatus comprising:

an image holding member;

a charging device that charges a surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to thereby form a toner image;

the transfer device according to claim 14 that transfers the toner image onto a surface of a recording medium; and a fixing device that fixes the toner image to the recording medium.

20. An image forming apparatus comprising:

an image holding member;

a charging device that charges a surface of the image holding member;

an electrostatic latent image forming device that forms an electrostatic latent image on the charged surface of the image holding member;

a developing device that houses a developer containing a toner and develops the electrostatic latent image formed on the surface of the image holding member with the developer to thereby form a toner image;

the transfer device according to claim 15 that transfers the toner image onto a surface of a recording medium; and a fixing device that fixes the toner image to the recording medium.

* * * * *